Aug. 19, 1969  J. A. BROCK ETAL  3,462,133
GAS BURNER FOR HEATING MOVING AIR
Filed Oct. 30, 1967  2 Sheets-Sheet 1

INVENTORS
James A. Brock
Robert H. Hughes
Edgar S. Downs
BY Scofield, Krager, Scofield + Lowe
ATTORNEYS

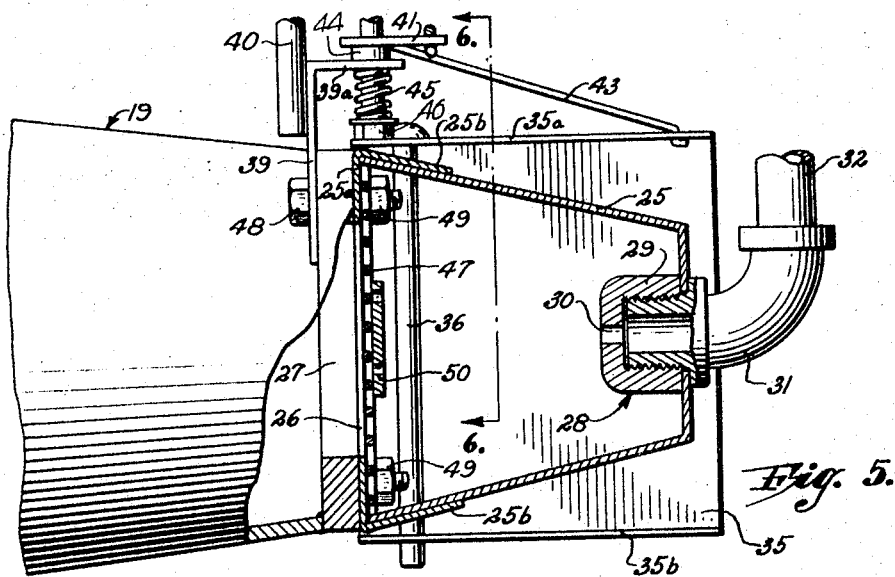
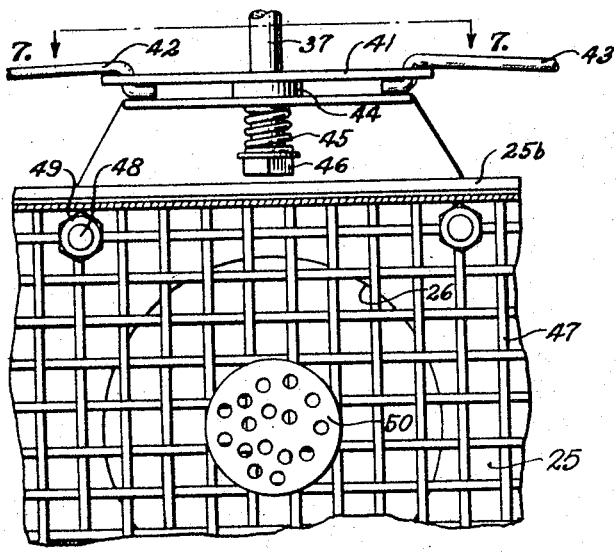
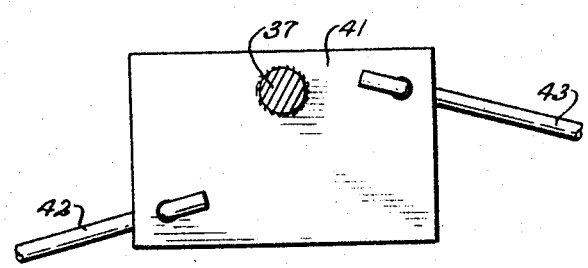

United States Patent Office 3,462,133
Patented Aug. 19, 1969

3,462,133
GAS BURNER FOR HEATING MOVING AIR
James A. Brock, Kansas City, Mo., Robert H. Hughes, Shawnee Mission, Kans., and Edgar S. Downs, Worthington, Ohio, assignors to Butler Manufacturing Company, Kansas City, Mo., a corporation of Missouri
Filed Oct. 30, 1967, Ser. No. 678,898
Int. Cl. F23l 9/04; F24h 3/02
U.S. Cl. 263—19    10 Claims

ABSTRACT OF THE DISCLOSURE

A conical combustion chamber is centered within a tubular housing through which air is moved. Air is fed in controlled amounts to the inlet end of the combustion chamber by a transversely oriented intake assembly providing adjustably sized intake ports adjacent the periphery of the housing and is mixed with gas at the inlet opening to the combustion chamber. The products of combustion are directed by a discharge structure having lateral discharge tubes into the air stream at points spaced outwardly from the axis of the main housing.

BACKGROUND AND SUMMARY OF THE INVENTION

The present invention has its most direct application in the heating of air for drying grain and like materials and in other situations where large quantities of air must be heated on a continuous flow basis.

Most high output heaters prior to our invention have employed either ring-type burners or gun-type burners. In the conventional ring-type burner, air and gas are introduced to a hollow ring positioned in the air stream and the mixture is metered from the ring through spaced orifices around the ring. The gas is ignited on entry into and thus burns directly in the air stream. In the gun-type burner, gas and air are mixed in the throat of a venturi tube, the mixture is ignited at the outlet end and impinges against the plate to diffuse the hot gases into the air stream. Both types of burners have posed problems, particularly in providing a high turn down ratio and in terms of efficiency.

One of the principal objects of the present invention is to provide a burner which has a very high turn down ratio and which operates over a wider range of air flow rates than other direct fired air heaters of which we are aware. This advantage is achieved through the provision of a special air intake and gas-air mixing arrangement in conjunction with the manner of feeding of the products of combustion back into the stream.

Another object of the invention is to provide a burner of the character described which has particular advantages in connection with air heaters employing propeller type fans for moving the air. In our structure, we provide for pick-up of the primary air at the zone of greatest air velocity and elimination of the undesirable effects resulting from the vacuum cone usually induced by propeller type fans. The air pick-up is achieved with little interference with the total air flow through the apparatus.

A further object of the invention is to provide a heater in which combustion is effected principally within the combustion chamber and associated discharge components, thereby to prevent rapid chilling of a partially burned mixture and the consequent production of objectionable aldehydes in the products of combustion. The efficiency of the heater is also materially improved by this aspect of the invention.

Further objects of the invention are, among others, to provide a burner device with convenient means for effecting variation of the quantities of primary air delivered to the burner combustion chamber, for obtaining effective heating with low head loss across the burner and for obtaining the ends and objectives heretofore set forth at relatively low cost.

Other and further objects of the invention, together with the features of novelty appurtenant thereto, will appear in the course of the following description.

DESCRIPTION OF THE DRAWINGS

In the accompanying drawings, which form a part of the specification and are to be read in conjunction therewith, and in which like reference numerals indicate like parts in the various views.

FIG. 5 is a greatly enlarged fragmentary sectional view taken along line 5—5 of FIG. 2 in the direction of the arrows;

FIG. 6 is an enlarged fragmentary sectional view taken generally along line 6—6 of FIG. 5 in the direction of the arrows; and FIG. 7 is a fragmentary sectional view taken generally along line 7—7 of FIG. 6 in the direction of the arrows.

Figure 1:
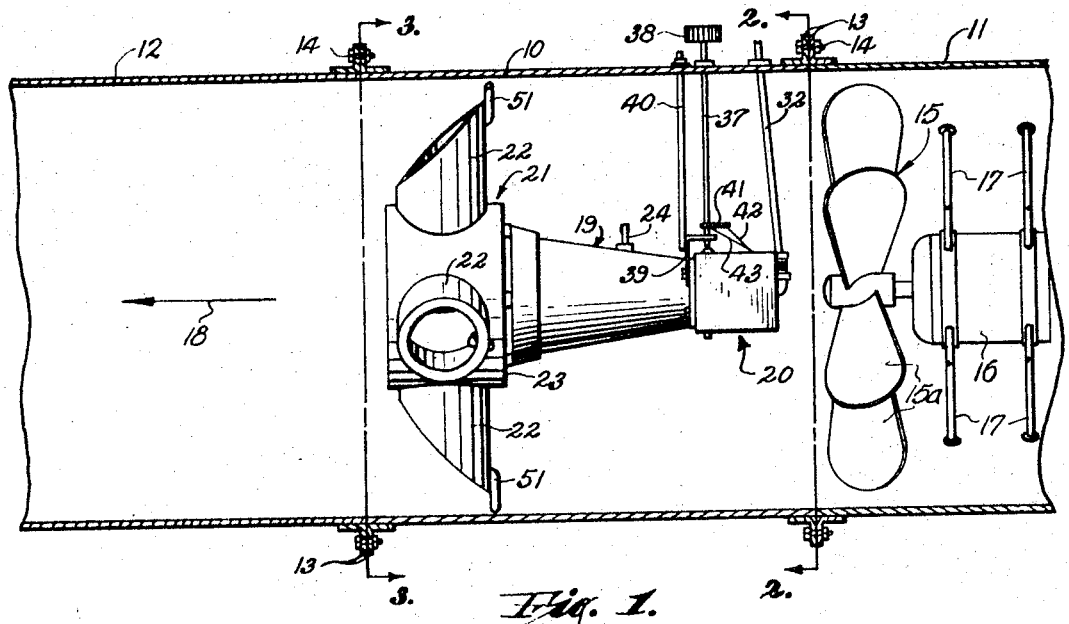
FIG. 1 is a partly sectional view through a portion of a burner, fan and air housing and showing a preferred burner structure according to the present invention in side elevation.
Figure 2:
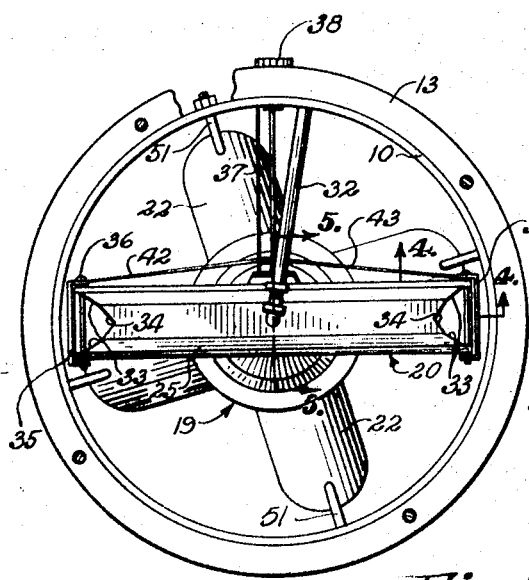
FIG. 2 is a sectional view taken along line 2—2 of FIG. 1 in the direction of the arrows.
Figure 3:
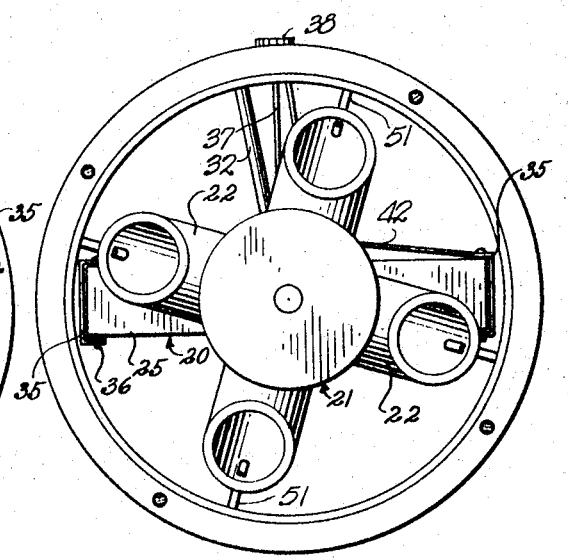
FIG. 3 is a sectional view taken along line 3—3 of FIG. 1 in the direction of the arrows.

Referring to the drawings, for purposes of illustration, we have shown a series of three aligned tubular housing sections of circular cross section, the sections being identified as a central burner housing 10, a fan housing 11, and a heated air conveying housing 12. The housings are respectively fitted with annular end flanges 13 by means of which the housing sections are coupled together with conventional fasteners 14, for example, bolts.

Supported within the housing 11 is a conventional propeller type fan 15 having the blades 15a. The fan is driven by an electric motor 16 which is centered in any conventional fashion, as by spokes 17 secured to and radiating from the fan housing and affixed at their outer ends to the interior of housing 11. The fan is rotated in a direction to cause air to move through the housing in the direction indicated by the arrow 18.

The burner structure of the present invention is centrally supported in the housing 10. This structure comprises basically a combustion chamber 19, an air intake assembly 20, and a burner discharge section 21, which includes the four equiangularly spaced tubes 22 radiating outwardly from a central housing.

The combustion chamber comprises a frusto-conically configured hollow housing which connects at its larger end with the central drum-like discharge housing 23 and is coupled at its smaller or inlet end with the air intake assembly 20, which includes a source of gas subsequently to be described. An ignition electrode 24 is positioned in the side of the combustion chamber and extends therein in conventional fashion. It is understood that a source of electricity will be connected with electrode 24, this not being shown. The combustion housing is preferably formed as a rough surfaced casting, at least as to its interior surface, for a purpose subsequently to be described.

The air intake assembly 20 includes as its basic element a trapezoidally cross sectioned tube 25 which extends diametrically across the interior of the housing 10. The tube 25 includes a vertical front wall 25a which is provided at its center with a circular opening 26 (FIGS. 5 and 6) which registers with the inlet entry opening 27 to the combustion chamber 19. The front wall 25a of tube 25 is joined with the remainder of the side walls of the tube by bent over flaps 25b which engage the outer surfaces of the inclined side walls (see FIG. 5).

The gas supply for the burner comprises a nozzle assembly 28 which is fitted into the back wall of the air intake tube and aligned with the inlet opening 27 to the combustion chamber. The nozzle includes a cap 29 having a central discharge orifice 30. The cap is threaded onto the inner end of a fitting 31 inserted through an opening in the back wall of the tube 25. Fitting 31 is in the form of an elbow which is connected with the gas feed line 32 which runs to the exterior of the main housing 10 and connects with an appropriate source of gas (not shown).

Returning now to a further description of the air tube 25, it will be noted that it is open at its opposite ends, the openings being formed by cutting the tube at an angle to the axis to provide the inclined edges 33. A further V-notch cut 34 is provided in the rear wall of the tube 25 at each end. Cooperating with the end edges 33 of the tube 25 to direct air into and control the volumetric flow rate of air into the tube and thus into the combustion chamber are movable shutters 35.

Figure 4:
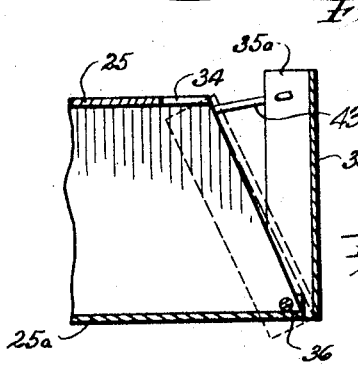
FIG. 4 is an enlarged fragmentary sectional view taken along line 4—4 of FIG. 2 in the direction of the arrows.

In each case, the shutter 35 comprises a flat main body having the inturned upper and lower flanges 35a, 35b (see FIGS. 4 and 5). Each shutter is pivoted to the end of the intake tube by a vertical pivot pin 36 so that the main body of the shutter is capable of swinging movement toward and away from the inclined end edges 33 of the tube. It will be evident that movement of the shutters toward and away from the tube will control the size of the air intake openings at the ends of the air intake tube.

To provide for manual adjustment of the settings of the air shutters 35, we have provided the linkage now to be described. Referring to FIG. 1, extending into the housing 10 from the exterior is a control rod 37 having a handle 38 on that end outside the housing 10. The inner end of this rod is journaled for pivotal movement in the horizontal flange 39a of a bracket 39 which is bolted or otherwise secured to the combustion chamber. Bracket 39 also serves as a connector means between the burner housing and a suspension member 40 which extends to and is secured to the fall of the housing 10 for supporting the combustion chamber.

Fixedly secured to the control rod 37 just above bracket flange 39a is a rectangular crank plate 41 which has connected to it two rod-like links 42, 43, extending in opposite directions toward the ends of the transverse air intake tube 25.

As best seen in FIGS. 5 and 6, the lower end of the control rod 37 is retained in its journaled relationship in its support member 39a by means of a pair of washers 44 above members 39a and a compressed spring 45 which is retained against the under side of the member 39a by a cap nut 46 on the bottom of the control rod. The pressure of the spring establishes a frictional resistance to rotation of rod 37 which holds the shutters in any set condition once moved to that position by manipulation of a handle 38 on the control rod.

The connecting rods or links 42, 43 are pivotally connected at their inner ends with crank plate 41 in the fashion illustrated in FIGS. 6 and 7. The rods are provided with jogged portions which form a generally Z or S shape and which can be slipped through apertures in the plate. The outer ends are pivotally connected in the same fashion with the upper flanges 35a of the respective shutters 35 near the outer ends thereof. It will be noted that the points of connection of the links 42, 43 with the plate 40 are such that rotation of the rod in one direction will cause both shutters to move toward their closed relationship with the ends of the air intake tube, whereas movement in the opposite direction will move them simultaneously toward the open position.

Turning once again to consideration of the inlet and of the combustion chamber 19, and referring again particularly to FIGS. 5 and 6, superposed over the inlet opening 27 is a rectangular metal screen 47. This completely covers the opening 27 and the associated opening 26 in the front wall of the air intake tube and is secured in place by bolts 48 and nuts 49, the bolts extending through the end flange of the combustion chamber. The bolts 48 also serve to connect the combustion chamber with the bracket 39 earlier described.

Centered on and welded to the screen 47 is a perforated metal disk 50. The disk is considerably lesser in diameter than the inlet opening to the combustion chamber and it is centered on line with the discharge orifice 30 of the gas nozzle 28. The disk provides a target against which the jet of gas emerging through orifice 30 impinges and serves effectively to disperse and intermix the gas with the air which is flowing toward the center of the air intake tube. The mixture of air and gas is further enhanced by the passage of the mixture through the screen into the inlet end of the combustion chamber.

As earlier noted, the combustion chamber 19 terminates in a generally cylindrical drum-like discharge housing 23 having the four radial discharge tubes 22 communicating therewith and extending therefrom. The outer ends of the tubes 22 are cut on a bias so that the outer end opening or port faces generally downstream. To assist in supporting the entire burner assembly and housing 10, J-hooks 51 are supported from the wall of the housing 10 with their hook portions extending through appropriate apertures in the sides of the tubes 22. It will be noted that the outer ends of tubes 22 are spaced somewhat away from the inside wall of the housing 10.

It will be understood that in addition to the structure shown in the drawings and described herein, a commercial burner will include controls for the gas flow, either thermostatic or manual, and other accessory devices conventionally associated with burners of this type. However, the details of these play no part in the present invention and accordingly their description has not been included.

In operation, the fan serves to force air through the main housing sections in the direction indicated by arrow 18. The fan will inherently set up a greater flow velocity adjacent the periphery of the housings, with the least flow being directly along the axis.

The high velocity air flowing adjacent the inside periphery of the housing is picked up at the outer ends of the transverse air intake tube 25 and is directed thereby toward the center of the tube where it is mixed in the fashion earlier described with the gas entering through pipe 32 and the gas nozzle 28. The volume of air flow through the combustion chamber can be controlled by adjustment of the position of the air shutters 35 the shutters being closed down toward the inclined end edges 33 of the intake tube to reduce flow and outwardly or away from them to increase flow. By providing for symmetrical pick-up of the air adjacent the periphery of the housing, we have avoided the uneven distribution which can be caused by the uneven distribution through the cross section of the housing resulting from the flow pattern created by a propeller fan. It will be noted that it is not possible to completely close off the ends because of the existence of the V-notched sections 34. This is a safety feature.

The provision of screen 47 in conjunction with the perforated metal target 50 assures of effective intermixing of the air and gas and the introduction into the combustion chamber of a relatively uniform gas-air mixture. We have found that we have been able to eliminate explosive and erratic ignition and also provide smooth operation over the entire output range of the unit. We have also found that by including the disk and screen, the positioning of the electrodes is much less critical than in other burners of which we are aware.

The flow into the combustion chamber is relatively smooth, approaching laminar flow conditions. By establishing such conditions, a boundary layer of cool air moves along the combustion chamber wall, thus reducing the surface temperature of the combustion chamber. This condition is further enhanced by using a rough surfaced casting which causes entrapment of a small amount of the cool air and thus creates an insulation effect between the hot gases and the surface of the combustion chamber. The cooling effect so obtained permits employment of cheaper materials for the combustion chamber.

It will be noted that by virtue of the provision of the trapezoidal cross section of the air intake tube 25, there is a generally smooth tapered configuration in the overall burner structure which reduces turbulence and establishes a relatively smooth flow along the conical exterior surface of the combustion chamber.

The gas-air mixture is fired inside the combustion chamber and the products of combustion flow into the discharge drum 23 and thence outwardly in substantially equal proportions through the radiating discharge tubes 22 into the high velocity portion of the flow stream. It will be evident that by virtue of facing the outlets generally downstream, the air flow around tubes 22 sets up an induced zone of low pressure at the outlets which assists materially in obtaining flow of the gases into the air stream and reduces the interior pressure of the burner. By terminating the tubes 22 short of contact with the interior of housing 10 there is an air cushion between the housing and tubes to prevent overheating of the housing.

Through the provision of effective air-gas mixing, smoothing of the flow into the housing and discharge arrangement above described, we have been able to provide a burner which has an infinite turn down ratio and operates more efficiently over a wider range than other direct fire burners utilized in crop dryers of which we are aware. The high turn down ratio permits the effective use of a standard burner assembly with a wide variety of fans operating under a wide variety of load conditions. We have also provided burners having extremely high efficiency with low head loss and which operates effectively at varying air flow rates.

From the foregoing it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof, it will be understood that all matter herein set forth or shown in the accompanying drawings is to be interpreted as illustrative and not in a limiting sense.

Having thus described our invention, we claim:

1. A heating device comprising
a tubular housing,
means for moving air through said housing in an axial direction,
a tubular air intake conduit disposed with its longitudinal centerline extending transversely across the interior of said housing, having intake openings at the opposite ends thereof near the periphery of the housing, the intake openings facing generally upstream,
air flow control means associated with said intake openings and operable to direct air thereinto and vary the quantity of air entering said openings,
a combustion chamber centrally positioned in said housing on the downstream side of said air intake conduit, said chamber having an inlet end connected centrally with said conduit for receiving air therefrom and a discharge end,
means for introducing gas into said chamber through said inlet to form a combustible gas-air mixture in the combustion chamber, and
discharge means at the discharge end of said combustion chamber for directing the products of combustion into said air moving through the housing and thereby heating same.

2. A heating device as in claim 1,
said discharge means including a plurality of angularly spaced discharge tubes positioned transversely in said housing and having discharge ends spaced away from the central axis of the housing.

3. A heating device as in claim 1,
said flow control means comprising pivotal shutter members connected with the respective ends of said intake conduit, and
a central control linkage operable to effect simultaneous opening and closing of said shutter members.

4. A heating device as in claim 3,
said control linkage including a rotatable shaft extending into said housing from the exterior thereof toward the center portion of said air intake conduit,
link members connected with the respective shutter members and extending toward said shaft, and
crank means interconnecting said link members with said shaft.

5. A heating device as in claim 1,
said combustion chamber having a generally tapered configuration with the inlet at the smaller end of the chamber, said air intake conduit having a maximum width in a direction transverse to the axis of the housing no greater than the width of said smaller end.

6. A heating device as in claim 5,
said air intake conduit having a tapered transverse cross section with the larger side of the conduit adjacent the inlet end of the combustion chamber.

7. A heating device as in claim 1,
said gas introduction means comprising a nozzle spaced from said inlet opening and operable to direct a jet of gas toward said opening, and
a screen covering said opening.

8. A heating device as in claim 7,
said screen including a perforated disk mounted centrally therein and positioned to interrupt the jet delivered by said nozzle to diffuse same.

9. A heating device as in claim 2,
said discharge tubes terminating at the outer ends thereof in ports which face downstream.

10. A heating device as in claim 5,
the interior of said combustion chamber being provided with a roughened surface.

References Cited

UNITED STATES PATENTS 2,985,438   5/1961   Prowler _____ 263—19

FOREIGN PATENTS 874,116   8/1961   Great Britain.

FREDERICK L. MATTESON, JR., Primary Examiner

E. G. FAVORS, Assistant Examiner

U.S. Cl. X.R.

126—110